G. H. BENJAMIN.
MACHINE FOR SOLDERING CHAINS.
APPLICATION FILED MAY 29, 1909.
978,542.
Patented Dec. 13, 1910.
3 SHEETS—SHEET 1.
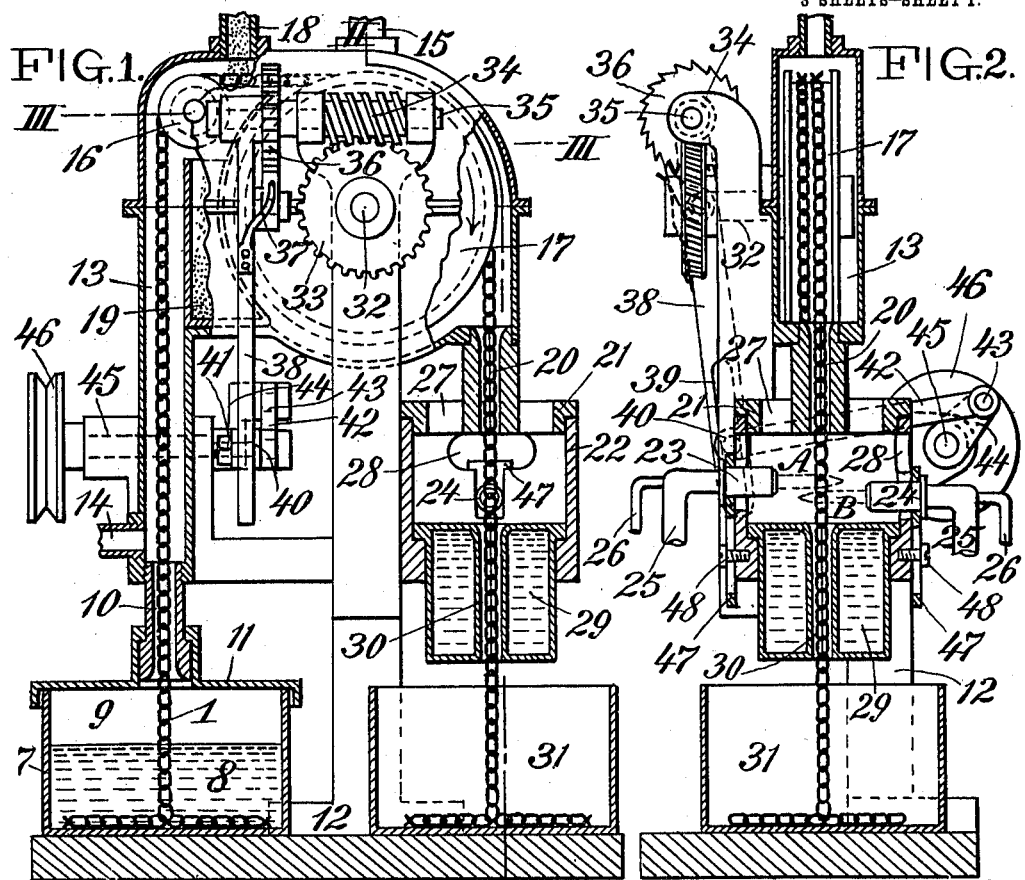
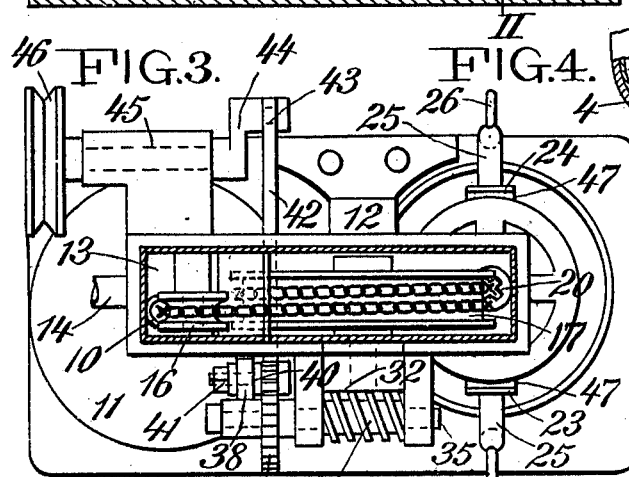
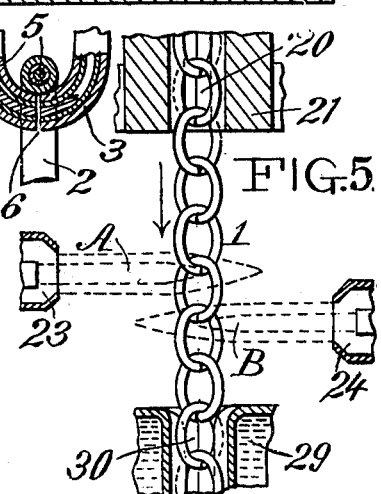

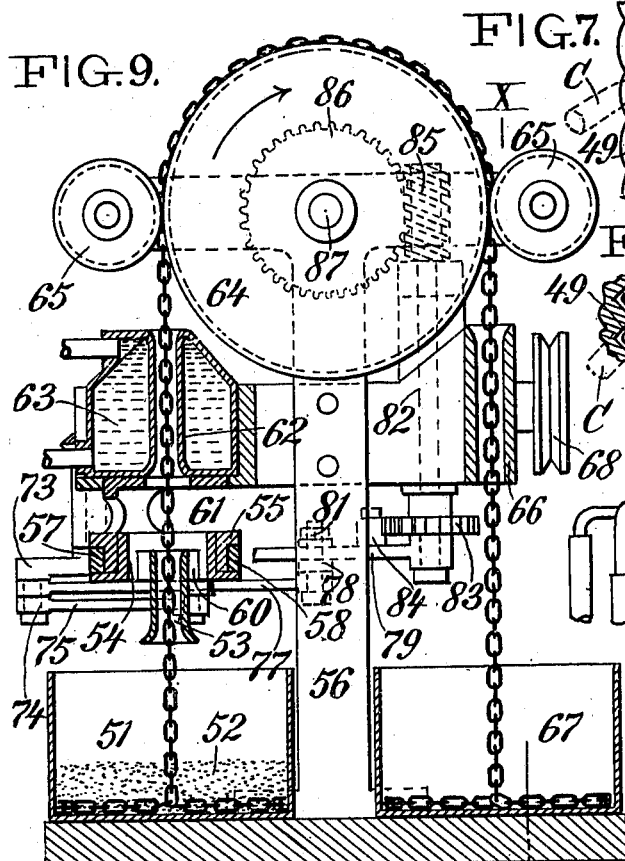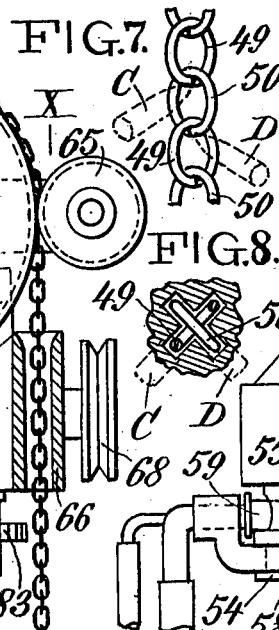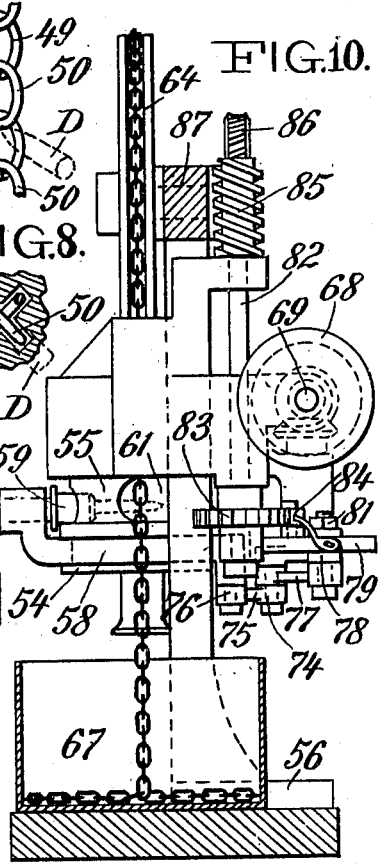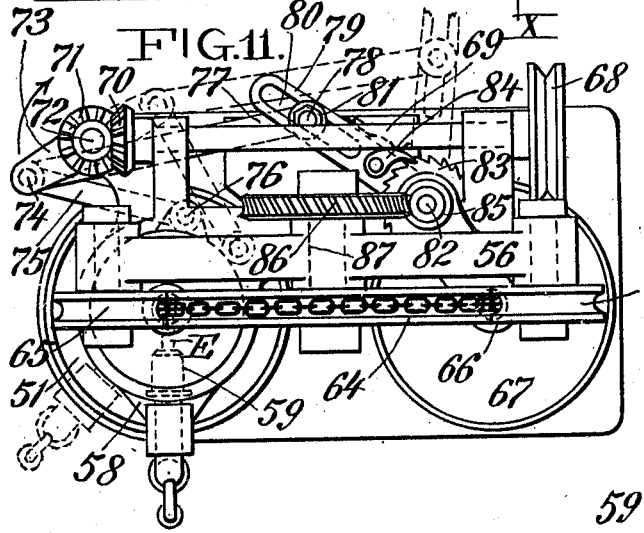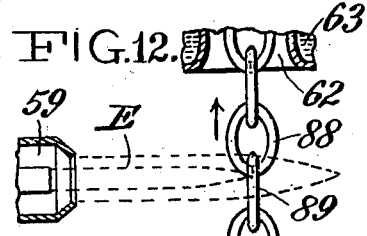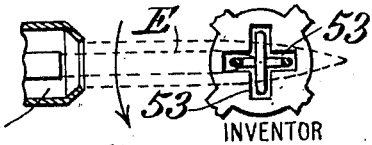

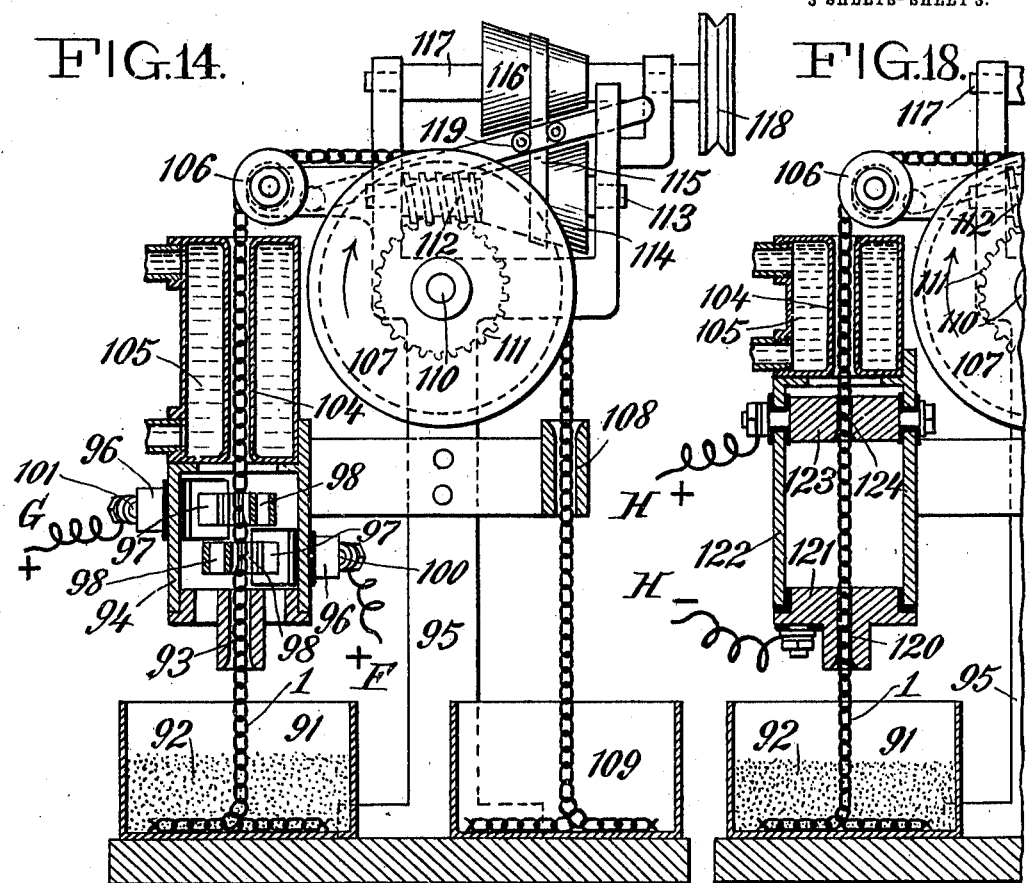

UNITED STATES PATENT OFFICE.

GEORGE HILLARD BENJAMIN, OF NEW YORK, N. Y., ASSIGNOR TO H. F. BARROWS CO., OF NORTH ATTLEBORO, MASSACHUSETTS.

MACHINE FOR SOLDERING CHAINS.

978,542.  Specification of Letters Patent.  Patented Dec. 13, 1910.

Application filed May 29, 1909. Serial No. 499,231.

*To all whom it may concern:*

Be it known that I, GEORGE HILLARD BENJAMIN, a citizen of the United States, residing at the city, county, and State of New York, have invented certain new and useful Improvements in Machines for Soldering Chains, of which the following is a specification.

This invention relates to means for handling unfinished chains, whereby a chain as it comes from a machine which forms a series of interconnected links cut from wire, can be heated at the jointed portions of the links, thereby causing solder contained within the wire of the links to flow out into the joints, thus effectually securing the links.

The object of the invention is to provide a means whereby the chain is so guided through a heat zone that the jointed portions of the links are more exposed to said heat than the body of the links.

In the accompanying drawings Figure 1 is a sectional elevation of a machine for carrying out this invention; Fig. 2 is a vertical section on the line II—II of Fig. 1; Fig. 3 is a sectional plan view on the line III—III of Fig. 1; Fig. 4 is a very much enlarged view of the links, showing the contained fusible solder and two abutting ends of the wire which are to be joined by means of the solder; Fig. 5 is an enlarged sectional view showing a series of links and the operation of heating the joints; Fig. 6 is a sectional plan view of parts shown in Fig. 5; Fig. 7 is a sectional elevation of a series of links showing a modified arrangement for heating the joints; Fig. 8 is a sectional plan view of parts shown in Fig. 7; Fig. 9 is a sectional elevation of a modified machine; Fig. 10 is a vertical section on the line X—X of Fig. 9; Fig. 11 is a plan view of the machine shown in Fig. 9; Fig. 12 is an enlarged sectional view showing a series of links and the operation of heating the joints, as shown in Figs. 9, 10 and 11; Fig. 13 is a sectional plan view of parts shown in Fig. 12; Fig. 14 is a sectional elevation of a machine wherein the links are heated by means of electricity; Fig. 15 is a plan view, partly in section, of the machine shown in Fig. 14; Fig. 16 is an enlarged view showing a series of links passing between electric contacts; Fig. 17 is a sectional plan view of parts shown in Fig. 16; and Fig. 18 is a view similar to Fig. 14, showing a modification of the means for heating the links.

The chain as it comes from the chain-making machine is composed of a series of links, each link being made of a bent wire 2 having the ends abutting, as shown in Fig. 4. As shown in Fig. 4, the wire 2, of which the links are made, is composed of a tube of plater's metal 3, having a core of fusible solder 4, and inside of the solder is a central wire 5 of plater's metal.

When heat is applied to the abutting ends of wire made as just described, the solder melts and runs into the space 6 between the abutting ends, and owing to the fact that the solder is distributed between the central wire 5 and the outer tube 3, when the solder runs it lodges between the abutting ends of the core, and also between the abutting ends of the outer tube, whereas if the solder were contained only in the center of a tube, the solder would run too freely in consequence of there being too small a proportion of the infusible metal in the path of the flowing solder.

Referring now to the machine represented in Figs. 1, 2 and 3, the chain 1 is removed from the chain-making machine and placed in a tank 7, containing a solution 8 which etches the metal, thereby preparing the surfaces at the abutting ends for the soldering operation. The chain passes up from the solution through a chamber 9 and a tube 10, and upon the outside of tube 10 a cover 11 for chamber 9 has vertical movement, in order that tank 7 can be removed from its support on the frame 12. From tube 10 the chain passes up into a chamber 13, through which a non-oxidizing gas is conveyed by means of the pipes 14 and 15. During its travel in chamber 13, the chain is protected against oxidation by means of the non-oxidizing gas. Within the chamber 13 are placed a roller 16 and a wheel 17, over which the chain passes. The chain passes up over roller 16 and horizontally across the wheel 17, and while traveling from roller 16 to wheel 17 magnesia is poured onto the chain through a pipe 18. The magnesia not finding lodgment on the chain is permitted to fall into a drawer 19, which can be removed when necessary. The coating of magnesia is intended to protect the outer surface of the links from the solder that might possibly flow out from between the abutting ends of the wire. The chain is passed once around the wheel 17, and the wheel being rotated, serves to move the chain forward. From wheel 17 the chain passes downward into guides 20 formed in a cover 21 of a cylinder 22.

Mounted on cylinder 22 are two blow-pipe burners 23 and 24, which project flames A and B in a contracted zone of heat against the chain as it passes across the space between the cover 21 and the lower part of the cylinder 22. The burners 23 and 24 are each provided with a gas supply-pipe 25 and an air supply-pipe 26. The cover 21 and cylinder 22 are provided with vents, as at 27 and 28, to permit products of combustion to escape, and to prevent undesirable heating of the chain.

The lower part of cylinder 22 is provided with a cooling jacket 29 having guides 30, through which the chain passes after being heated by the flames A and B. From guides 30 the chain is delivered to a receptacle 31, which may be removed from frame 12 when desired.

It will be seen that the portion of chain moving downward in guides 20 of cover 21, is screened from the flames, and that the portion of chain passing through guides 30 is both screened and cooled by the water jacket 29 so that the portion of chain passing across the narrow space between the cover 21 and the water jacket 29 is exposed to a contracted zone of heat. Further, it will be evident that the blow pipe flames are projected against the chain in such a manner that a contracted zone of intense heat is produced at the junction of said flames with the chain.

Wheel 17 is secured to a shaft 32, to which is secured a worm wheel 33 in mesh with a worm 34 on a shaft 35. To shaft 35 is secured a ratchet wheel 36 which is actuated by engagement with a spring-pressed pawl 37 pivoted upon a lever 38. Lever 38 is pivoted upon shaft 35, and the free end of the lever is provided with a slot 39, in which is adjusted a pin 40 by means of a screw and nut 41. Pin 40 is connected by a rod 42 to a pin 43 on a crank 44. Crank 44 is secured to one end of a shaft 45, a drive-pulley 46 being secured to the opposite end.

Rotation of crank 44 causes a back-and-forth movement of lever 38, and a consequent intermittent forward movement of worm 34, by means of the ratchet wheel 36 and pawl 37. The intermittent movement of worm 34 is transmitted to the worm wheel 33, shaft 32, and wheel 17, thus causing an intermittent forward movement of the chain, and the parts are so proportioned that each back-and-forth movement of lever 38 causes a forward movement of the chain equal to the length of one link. By means of the nut and screw 41, the pin 40 can be adjusted in slot 39, so that each back-and-forth movement of lever 38 will cause a forward movement of the chain to suit longer or shorter links. As the chain moves downward, it is maintained in a fixed relation to the flames A and B by means of the guides 20 and 30. The burners 23 and 24 are placed diametrically opposite each other, and have such relation to the guides 20 and 30 that the flames A and B impinge against the chain on a line midway between links standing at right-angles to each other. By means of a slide 47 and screw 48, the burners 23 and 24 are so adjusted vertically, that flame A shall strike the joint of a link a distance removed from flame B equal to the length of one link, and both burners are so adjusted that flames A and B shall impinge against the joints of the links during the time the chain remains stationary between successive forward movements. It will be seen that the joints will be more exposed to the flames than the bodies of the links, thereby causing flow of only enough solder to fill the space between the abutting ends.

In the modification shown by Figs. 7 and 8, the burners 23 and 24 are so placed in the cylinder 22 that a flame C from burner 23 will stand in line with one set of links 49, while a flame D from burner 24 will stand in line with the set of links 50 at right-angles. The forward movement of the chain will be so changed that a distance equal to the length of two links will be traversed for each back-and-forth movement of lever 38. One set of links 49 will then be exposed to C, while the set 50, at right-angles, will be exposed to flame D.

In the machine shown by Figs. 9 to 13, inclusive, the unfinished chain 1, after being etched by a suitable solution, is placed in a receptacle 51 containing magnesia 52, which is intended to protect the chain from oxidation, and to prevent flow of solder to the outer surfaces of the links. The chain is then passed up through guides 53, forming part of a sleeve 54, which is secured to a cylinder 55 attached to the frame 56. In a groove 57, formed by sleeve 54 and cylinder 55, is mounted a ring 58, carrying a blow-pipe burner 59, which causes a flame E to be thrown horizontally across the path of the chain during its upward travel. Suitable vents 60 and 61 are provided for escape of products of combustion, and to carry undesirable heat away from the chain. The chain is then passed up through a tube 62, which is cooled by a cooling jacket 63. The chain then passes up and over a rotating wheel 64, which is adapted to move the chain intermittently forward. Guide rollers 65 serve to keep the chain in engagement with the wheel 64. The chain passes down from wheel 64 through a tube 66 and into a receptacle 67. A drive-pulley 68 is secured to a shaft 69, and shaft 69, by means of a bevel-gearing 70 and 71, drives a vertical shaft 72. To the lower end of vertical shaft 72 is secured a crank 73 having a crank pin 74, which is connected by a link 75, to a pin 76, forming part of the ring 58. Every complete revolution of crank 73 causes the ring 58, together with the burner 59, to make a quarter turn in one direction and then back. The pin 74 on crank 73 is connected by a link 77 to a pin 78 attached to a lever 79 having a slot 80. By means of a nut and screw 81 the pin 78 can be adjusted in slot 80, so that rotation of crank 73 shall cause more or less oscillatory movement of lever 79 upon a shaft 82, on which it is pivoted. Secured to shaft 82 is a ratchet-wheel 83, which is engaged by a spring-pressed pawl 84, pivoted upon lever 79, and adapted to cause rotation of said shaft when the lever is oscillated in one direction but not in the other, whereby an intermittent rotary movement is imparted to the shaft 82. To shaft 82 is secured a worm 85 in mesh with a worm-wheel 86 secured to a shaft 87, to which the wheel 64 is also secured. The intermittent movements of the shaft 82 carrying the worm 85 thus cause an intermittent movement of the wheel, around which the chain passes, and by adjustment of pin 78 in the slot 80 of lever 79, each rotation of crank 73 will cause a forward movement of the chain equal to the length of one link.

Referring now to Figs. 11, 12 and 13, as shown in Fig. 12, the chain is moving intermittently upward, and the joints are at the lower end of the links. When crank 73 rotates to the position shown by dotted lines, the chain will have reached the end of an upward movement, and the flame E will be 45° removed from the plane of either series of links. The flame will then impinge against the joint of a link 88, and oscillate further until the flame is in line with the plane of link 88, as shown in Figs. 12 and 13. The flame will then be oscillated in the direction indicated by the arrow in Fig. 13, until it reaches the position shown in Fig. 11. The flame will then strike the link 89, and oscillate to a position 45° removed from the plane of either series of links during the upward movement of the chain. The flame will then impinge against the joint of link 89 and oscillate further until the flame is in line with the plane of link 90. The flame will then oscillate in the direction indicated by the arrow in Fig. 13 until it reaches the position shown in Fig. 11. The flame will then strike the joint of link 89 and oscillate to a position 45° removed from the plane of either series of links, during the upward movement of the chain.

In the machine shown by Figs. 14 to 17, inclusive, the unfinished chain 1, after being etched by a suitable solution, is placed in a receptacle 91 containing magnesia 92. The chain is then passed up through guides 93 forming part of a cylinder 94 attached to the frame 95. Mounted in cylinder 94 are insulated cups 96, in which are mounted slides 97 having electric contacts 98, the contact of each slide being forced against the chain by means of a spring 99 acting on the slide. A source of electric energy F is connected to shanks 100 of one pair of slides, and a source of electric energy G is connected to shanks 101 of a pair of slides placed at a right-angle to the slides having the shank 100. The chain passes between the contacts 98, and the contacts to which the source of electric energy F is connected, are pressed against a series of links 102, while the contacts to which the source of electric energy G is connected are pressed against the series of links 103. While the links are passing between the contacts 98, the space 6 at the joint offers resistance to the passage of the electric energy, causing the joint to be heated, as the size of the wire from which the links are made is not sufficient to carry the electric energy without offering resistance. The joints of the links will, therefore, be heated, causing the solder to flow into the space 6, thereby securing the links. From contacts 98, the chain passes up through a tube 104, which is cooled by a cooling jacket 105. The chain then passes over a roller 106, and around a wheel 107, which is adapted to move the chain continuously forward. The chain passes down from wheel 107 through a tube 108 and into a receptacle 109. Wheel 107 is secured to a shaft 110, to which is secured a worm-wheel 111 in mesh with a worm 112 on a shaft 113. To shaft 113 is secured a cone pulley 114, which is driven by a belt 115 from a cone pulley 116 on a shaft 117 carrying a drive-pulley 118. By means of a belt shipper 119, the belt 115 can be shifted on the cone pulleys, so that the speed of the worm 112 can be changed, thereby varying the speed of forward movement of the chain.

The modification shown in Fig. 18 differs from the one just described, only in the mode of heating. The chain 1, as it passes up from the magnesia 92, is passed through guides 120 forming part of an insulated contact 121, which is secured to the lower end of a cylinder 122, through which the chain passes. The upper end of cylinder 122 is provided with an insulated contact 123 having guides 124, through which the chain passes. To the contacts 121 and 123 is secured a source of electric energy H. While the chain passes between the contacts 121 and 123, the length of chain between the two contacts is heated, owing to the resistance offered to the passage of the energy, because of the series of spaces 6, and the small size of the chain.

I claim as my invention:

1. A machine for fastening interconnected chain links having abutting ends of solder cored wire, comprising a source of heat energy, means for moving said links successively through a contracted zone of said heat, and means for concentrating said heat energy mainly against said abutting ends during their travel through said heat zone.

2. A machine for fastening interconnected chain links having abutting ends of solder cored wire, comprising a burner for projecting a heating flame, means for moving said links successively through said flame, a guide serving the twofold purpose of guiding the abutting ends of any one of said links into range with said flame, and of guiding the body of said link out of range during said travel of the abutting ends into range with said flame.

3. A machine for fastening interconnected chain links having abutting ends of solder cored wire, comprising means for imparting an intermittent movement to said links successively and equal to the length of one link, means for projecting a heating flame across the longitudinal axis of a succession of said links, and means for guiding said links whereby the abutting ends are moved in line with said longitudinal axis, and the body of each link is moved out of range with said flame.

4. A machine for fastening interconnected chain links having abutting ends of solder cored wire said abutting ends being located at the points of contact of the links with each other, comprising means for imparting forward movement to said links successively and for guiding the abutting ends in line with the longitudinal axis of a succession of said links, a burner for projecting a heating flame across the path of travel of said abutting ends, and means for imparting an oscillatory movement to said flame during forward travel of said links, whereby said abutting ends of successive links traveling in planes at right angles to each other are exposed to said flame.

5. A machine for fastening interconnected chain links having abutting ends of solder cored wire said abutting ends being located at the points of contact of the links with each other, comprising means for imparting forward movement to said links successively and for guiding the abutting ends in line with the longitudinal axis of a succession of said links, a burner for projecting a heating flame across the path of travel of said abutting ends, means for imparting an oscillatory movement to said burner during forward movement of said links, and adjusting devices whereby the amount of forward movement which takes place during an oscillatory movement of the burner can be made equal to the length of one of said links.

6. A machine for fastening interconnected chain links having abutting ends of solder cored wire, comprising an actuating device for imparting an intermittent forward movement to said links successively, a source of heat energy, means serving the twofold purpose of subjecting the abutting ends of any one of said links to said heat energy, and of subjecting the abutting ends of a succeeding link to said heat in a plane at a right angle to that applied to the first named link, and means for regulating the length of said intermittent movements to equal the length of each link, whereby said abutting ends are placed in range with said heat energy at the end of each of said movements.

7. A machine for fastening interconnected chain links having abutting ends of solder cored wire said abutting ends being located at the points of contact of the links with each other, comprising means for imparting an intermittent forward movement to said links successively and means for guiding said abutting ends in line with the longitudinal axis of a succession of said links, a burner for projecting a heating flame across said longitudinal axis, and means for regulating the length of said intermittent movements of the links, whereby said abutting ends are exposed to said flame at the end of said intermittent movements.

8. A machine for fastening interconnected chain links having abutting ends of solder cored wire, comprising means for imparting forward movement to said links successively, a source of heat energy, means for subjecting the abutting ends of said moving links to said heat energy applied in planes at right angles to each other, and means for guiding the body of said links out of range with said heat whereby the abutting ends of each link are more exposed to said heat than the body of the link.

9. An apparatus for fastening interconnected chain links having abutting ends of solder cored wire said abutting ends being located at the points of contact of the links with each other, comprising means for imparting forward movement to said links successively, means for guiding said abutting ends in line with the longitudinal axis of a succession of said links, means for projecting heat energy across the path of travel of said abutting ends, means for guiding the body of said links out of range with said heat whereby the abutting ends of each link are more exposed to said heat than the body of the link, and means for cooling the links as they emerge from said heat.

10. A machine for fastening interconnected chain links having abutting ends of solder cored wire said abutting ends being located at the points of contact of the links with each other, comprising a burner for projecting a heating flame across the longitudinal axis, of a succession of said links, means for intermittently moving the abutting ends of said links successively in line with said longitudinal axis, the length of each intermittent movement being equal to the length of one link; and means whereby the abutting ends of each succeeding link are caused to stand in range with the hottest portion of said flame at the end of corresponding succeeding intermittent movements.

In testimony whereof, I affix my signature, in the presence of two witnesses.

GEORGE HILLARD BENJAMIN.

Witnesses:
W. A. TOWNER, Jr.,
H. E. KOELSCH.